US011116207B2

(12) United States Patent
Chetty et al.

(10) Patent No.: US 11,116,207 B2
(45) Date of Patent: *Sep. 14, 2021

(54) EMULSIFIABLE CONCENTRATE COMPRISING PICOLINIC ACID HERBICIDE

(71) Applicant: NUFARM AUSTRALIA LIMITED, Laverton (AU)

(72) Inventors: Nirisha Yellapah Chetty, Laverton North (AU); Allan Spencer, Ferntree Gully (AU); Chad Richard Ord Sayer, Brighton (AU)

(73) Assignee: NUFARM AUTRALIA LIMITED, Laverton North (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/571,729

(22) PCT Filed: May 6, 2016

(86) PCT No.: PCT/AU2016/050337
§ 371 (c)(1),
(2) Date: Nov. 3, 2017

(87) PCT Pub. No.: WO2016/176743
PCT Pub. Date: Nov. 10, 2016

(65) Prior Publication Data
US 2018/0153160 A1    Jun. 7, 2018

(30) Foreign Application Priority Data

May 7, 2015   (AU) ................ 2015901643

(51) Int. Cl.
*A01N 25/04* (2006.01)
*A01N 43/40* (2006.01)
*A01N 25/02* (2006.01)
*A01N 25/22* (2006.01)

(52) U.S. Cl.
CPC ............. *A01N 25/04* (2013.01); *A01N 25/02* (2013.01); *A01N 25/22* (2013.01); *A01N 43/40* (2013.01)

(58) Field of Classification Search
CPC ........ A01N 25/04; A01N 25/22; A01N 43/40; A01N 25/02
See application file for complete search history.

(56) References Cited

U.S. PATENT DOCUMENTS

| 4,213,776 A | 7/1980 | Giilk et al. | |
| 6,803,345 B2 * | 10/2004 | Herold | A01N 25/02 |
| | | | 504/254 |
| 8,044,059 B2 | 10/2011 | Hopkins et al. | |
| 8,426,341 B2 | 4/2013 | Volgas et al. | |
| 8,669,209 B2 * | 3/2014 | Keeney | A01N 43/40 |
| | | | 504/244 |
| 10,492,488 B2 | 12/2019 | Panayi et al. | |
| 10,772,323 B2 * | 9/2020 | Sharma | A01N 37/40 |
| 2002/0107149 A1 | 8/2002 | Volgas et al. | |
| 2003/0211943 A1 | 11/2003 | Harwell | |
| 2009/0062121 A1 | 3/2009 | Satchivi et al. | |
| 2009/0215797 A1 | 8/2009 | Hopkins et al. | |
| 2010/0016163 A1 | 1/2010 | Keiper et al. | |
| 2010/0105558 A1 | 4/2010 | Li et al. | |
| 2013/0157862 A1 * | 6/2013 | Panayi | A01N 43/40 |
| | | | 504/287 |
| 2014/0371075 A1 | 12/2014 | Dieleman et al. | |
| 2015/0105254 A1 * | 4/2015 | Li | A01N 37/40 |
| | | | 504/105 |
| 2016/0050919 A1 | 2/2016 | Byrne et al. | |
| 2018/0153161 A1 | 6/2018 | Sharma et al. | |

FOREIGN PATENT DOCUMENTS

| EP | 2815649 A1 | 12/2014 |
| GB | 1079622 A | 8/1967 |
| WO | 2007/030885 A1 | 3/2007 |
| WO | 2007/140332 A2 | 12/2007 |
| WO | 2011/019652 A2 | 2/2011 |
| WO | 2011/080208 A1 | 7/2011 |
| WO | 2011/082162 A1 | 7/2011 |
| WO | 2012/003441 A1 | 1/2012 |
| WO | 2012/040785 A1 | 4/2012 |
| WO | 2013/082016 A1 | 6/2013 |
| WO | 2013/126947 A1 | 9/2013 |
| WO | 2015/054561 A1 | 4/2015 |
| WO | 2016/050782 A1 | 4/2016 |

OTHER PUBLICATIONS

International Search Report and Written Opinion for Application No. PCT/AU2016/050336 (dated Jun. 10, 2016).
International Preliminary Report on Patentability for Application No. PCT/AU2016/050336 (dated Sep. 4, 2017).
International Search Report and Written Opinion for Application No. PCT/AU2016/050334 (dated Jul. 4, 2016).
International Preliminary Report on Patentability for Application No. PCT/AU2016/050334 (dated Mar. 28, 2017).
Anon, "Material Safety Data Sheet: Product Name: Solvesso 200 Fluid," Pure Chemicals Co., Chennai, Tamilnadu, India (2014).
Extended European Search Report for Application No. 16788968 (dated Nov. 2, 2018).
Extended European Search Report for Application No. 16788966.6 (dated Oct. 19, 2018).
Armel et al., "Common Commercial Pre-Packaged Herbicide Mixtures," UT Extension 1-28 (2008).
International Search Report and Written Opinion for corresponding Application No. PCT/AU2016/050337 (dated Jun. 7, 2016).

* cited by examiner

*Primary Examiner* — John Pak
*Assistant Examiner* — Andriae M Holt
(74) *Attorney, Agent, or Firm* — Troutman Pepper Hamilton Sanders LLP (Rochester)

(57) ABSTRACT

An emulsifiable concentrate of a picolinic acid herbicide comprising a picolinic acid dissolved in an amide solvent and at least one amine.

19 Claims, No Drawings

EMULSIFIABLE CONCENTRATE COMPRISING PICOLINIC ACID HERBICIDE

This application is a national stage application under 35 U.S.C. § 371 of PCT Application No. PCT/AU2016/050337, filed May 6, 2016, which claims the priority benefit of Australia Patent Application No. 2015901643, filed May 7, 2015.

FIELD

The invention relates to an herbicidal emulsifiable concentrate comprising a picolinic acid herbicide in acid form and to a method for the preparation and use of the concentrate in control of weeds.

BACKGROUND

Picolinic acid herbicides share a similar structure, having the pyridine-2-carboxylic acid functional group, and share similar activity in belonging to the class of synthetic auxins and being useful in control of broadleaf crops.

Picloram, is the common name for 4-amino-3,5,6-trichloropicolinic acid, aminopyralid is the common name of the herbicide 4-amino-3,6-dichloropyridine-2-carboxylic acid and clopyralid is the common name of the herbicidal compound 3,6-dichloro-2-pyridinecarboxylic acid. The picolinic acids are selective herbicide absorbed through the leaves and roots of target plants and are translocated throughout the plant. Picolinic acids act specifically as auxin-mimics, meaning they imitate the growth promotion action of the plant hormone auxin, causing uncontrolled, disorganised growth ultimately leading to vascular tissue disruption and plant death. They are used for control of a wide range of annual and perennial broadleaf weeds. Picolinic acid herbicides are particularly effective against pernicious/troublesome weeds such as Mugwort, dockweeds, thistles, bramble and Japanese Knotweed.

Picolinic acid herbicides are often used in combination with other herbicides such as other synthetic auxin herbicides and/or glyphosate to improve control of broadleaf weeds and perennial and woody weeds.

The emulsifiable concentrate, a liquid homogeneous formulation to be applied as an emulsion after dilution in water, is one of the most common formulation types for many agricultural products. Emulsifiable concentrates are mixtures of an oil-soluble active ingredient and emulsifying agents dissolved in an organic solvent. The emulsifying agent enables the emulsifiable concentrate to disperse easily in water, thereby forming a "milky" and homogenous emulsion. Emulsifiable concentrates require tank agitation to form the emulsion and maintain it during spraying. However, many challenges may exist, when, for instance, active ingredients may react with one another or with other ingredients in the formulation.

The solubility of picolinic acid herbicides in water is about 0.52 mg/L at 20° C. The acid form is also poorly soluble in common solvents, for example 26.46 g/l Methanol, <0.71 g/l n-hexane and 4.47 g/l n-octanol (at 20±0.5° C.). Picolinic acid herbicides are commonly formulated in the form of salts which are highly water-soluble and esters which are readily soluble in organic solvents and formulated as emulsifiable concentrates. Examples of commonly used forms of picolinic acid herbicides include the isooctyl ester, potassium salt, alkanolamine salt, diethanolamine salt and triisopropanolamine salt. The picolinic acid herbicide esters are more active than the salts but are more likely to volatilize with the potential to damage off-target plants. The esters and salts are each converted in the target plants to the acid form, which is active in controlling plant growth.

Some acid herbicides have been formulated as the form of the acid. Volgas et al. (U.S. Pat. No. 8,426,341) discloses an acid herbicide concentrate with a specific alcohol ethoxylate emulsifier to form a microemulsion on dilution with water.

Groenewegen et al. (US 2012/0283103) describes the use of certain fatty acid amide solvents to form concentrate emulsions (CEs) and emulsifiable concentrates (ECs) of synthetic auxin herbicides. The amide solvents are said to have high solvency for water insoluble compounds in preparing concentrates in the form of emulsions (CEs) and emulsifiable concentrates (ECs).

We have found that emulsifiable concentrates of picolinic acid herbicides in amide solvents have poor solution stability on storage giving rise to crystal formation in the concentrate and/or crystal formation on dilution of the concentrate to form an emulsion. Poor storage stability and the consequential formation of precipitates can disrupt effective use of the herbicide through clogging of spray equipment and/or dosing of the herbicide at a lower rate than desired.

There is a need for a more highly stable emulsifiable concentrate of picolinic acid herbicides which stabilises a concentrate of the herbicide in the acid form.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY

We provide an emulsifiable concentrate comprising a picolinic acid herbicide in acid form dissolved in an amide solvent and amine.

The amine (which when there is more than one said amine is the total of the amines) is preferably present in an amount of from 0.5% to 5% by weight more preferably from 2% to 5%, still more preferably from 3% to 5% by weight of the amine based on the weight of the emulsifiable concentrate.

There is further provided a method for the preparation of an emulsifiable concentrate of picolinic acid herbicide comprising combining picolinic acid herbicide in acid form with an amide solvent and amine and heating the compositions, preferably to a temperature of at least 40° C., more preferably 50° C., still more preferably at least 60° C. and most preferably at least 75° C., to provide a solution of the picolinic acid herbicide. In a preferred embodiment the process comprises dissolving picolinic acid herbicide in acid form in the amide solvent at a temperature of at least 40° C., more preferably 50° C., still more preferably at least 60° C. and most preferably at least 75° C. and subsequently combining the amide solution of picolinic acid herbicide with other materials. This order of combining the components has been found to further improve stability of the final formulation. The addition of a base was tried at various levels and this was found to improve stability and emulsion formation.

There is further provided a method of controlling weeds comprising providing an emulsifiable concentrate according to the above, diluting the concentrate with water to provide an emulsion and applying the diluted concentrate to the weeds to be controlled.

DETAILED DESCRIPTION

The term "emulsion", as used herein refers to a fine dispersion of minute droplets of one liquid in another in which it is not soluble or miscible and includes microemulsions and macroemulsions. The term "emulsifiable concentrates" refers to concentrates which, on dilution with water form either microemulsions or macroemulsions.

Throughout the description and the claims of this specification the word "comprise" and variations of the word, such as "comprising" and "comprises" is not intended to exclude other additives, components, integers or steps.

The term picolinic acid includes herbicides comprising the pyridine group substituted in the 2-position by a carboxylic acid. The herbicides are generally chlorinated. In the present invention the picolinic acid herbicides are present in the concentrate in the acid form. Specific examples of picolinic acid herbicides include picloram, clopyralid, halauxifen, aminopyralid and fluroxypyr. More preferred picolinic acid herbicides are selected from picloram, clopyralid, aminopyralid, fluroxypyr and mixtures of two or three thereof.

The concentrate composition comprises picolinic acid herbicide in acid form. Typically the picolinic acid herbicide will be present in an amount of at least 20 g picolinic acid herbicide per litre of emulsifiable concentrate, preferably at least 50 g/L, more preferably at least 150 g/L.

The emulsifiable concentrate composition comprises an amine. The amine is typically a primary secondary or tertiary amine and may comprise aliphatic straight or branched chain substituents, aliphatic ring substituents or the amine nitrogen may be the heteroatom of a aliphatic heterocyclic amine. The amine may comprise a plurality of amine groups and/or mixture of amines.

In one embodiment the amine comprises at least one amine of formula (I)

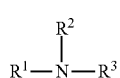

(I)

wherein $R^1$, $R^2$ and $R^3$ are independently selected from the group consisting of hydrogen, $C_1$ to $C_{10}$ alkyl; $C_5$ or $C_6$ cycloaliphatic optionally substituted with from one to four $C_1$ to $C_4$ alkyl groups and/or an amino-$C_1$ to $C_4$ alkyl group; $C_1$ to $C_{10}$ alkyl substituted with a substituent selected from the group consisting of hydroxyl, $C_1$ to $C_{10}$ alkoxy, amino, $C_1$ to $C_6$ alkylamino and di-($C_1$ to $C_6$ alkyl)amino; and the group wherein two of $R^1$, $R^2$ and $R^3$ together form a ring of 5 or 6 constituent ring members selected from methylene, —O—, —N— and —N($C_1$ to $C_6$-alkyl)- and the other of $R^1$, $R^2$ and $R^3$ is selected from hydrogen, $C_1$ to $C_6$ alkyl and $C_1$ to $C_6$ alkyl substituted with a substituent selected from the group consisting of hydroxyl, $C_1$ to $C_6$ alkoxy, amino and $C_1$ to $C_6$ alkylamino; and wherein at least one of $R^1$, $R^2$ and $R^3$ is other than hydrogen.

In one set of embodiments the amine is of formula I wherein $R^1$, $R^2$ and $R^3$ are independently selected from the group of hydrogen and $C_1$ to $C_{10}$ alkyl wherein at least one of $R^1$, $R^2$ and $R^3$ is $C_1$ to $C_{10}$ alkyl. Preferred amines in this group are mono-, di- and tri-($C_1$ to $C_6$ alkyl)amines and preferably tri-($C_1$ to $C_4$ alkyl)amines such as triethylamine.

In a further set of amines of formula I $R^1$, $R^2$ and $R^3$ are independently selected from the group consisting of hydrogen, $C_1$ to $C_{10}$ alkyl and $C_1$ to $C_{10}$ alkyl substituted with a substituent selected from the group consisting of hydroxyl, $C_1$ to $C_{10}$ alkoxy, amino, ($C_1$ to $C_6$ alkyl)amino and di-($C_1$ to $C_6$ alkyl)amino wherein at least one of $R^1$, $R^2$ and $R^3$ is other than hydrogen and ($C_1$ to $C_{10}$)alkyl. Examples of amines in this group include compounds of formula I wherein $R^1$, $R^2$ and $R^3$ are independently selected from hydrogen, $C_1$ to $C_6$ alkyl and $C_1$ to $C_6$ alkyl substituted with a substituent selected from the group consisting of hydroxyl, $C_1$ to $C_6$ alkoxy, amino, ($C_1$ to $C_4$ alkyl)amino and di-($C_1$ to $C_4$ alkyl)amino wherein at least one of $R^1$, $R^2$ and $R^3$ is other than hydrogen and $C_1$ to $C_6$ alkyl. More specific examples of this group of compounds include $C_1$ to $C_6$ alkanolamines, di-($C_1$ to $C_6$ alkanol)amines, tri-($C_1$ to $C_6$ alkanol)amines, di-($C_1$ to $C_6$ alkyl)$C_1$ to $C_6$ alkanolamines, amino($C_1$ to $C_6$ alkyl)di-($C_1$ to $C_6$ alkyl)amines, di-(amino-$C_1$ to $C_6$ alkyl) ($C_1$ to $C_6$ alkyl)amines.

In a further set of amines of Formula I two of $R^1$, $R^2$ and $R^3$ together form a ring, incorporating the amine nitrogen, of 5 or 6 constituent ring members selected from the group consisting of methylene and optionally a further heteroatom ring member selected from —O—, —N(H)— and —N($C_1$ to $C_6$-alkyl)-; and the other of $R^1$, $R^2$ and $R^3$ is selected from hydrogen, $C_1$ to $C_6$ alkyl and $C_1$ to $C_6$ alkyl substituted with a substituent selected from the group consisting of hydroxyl, $C_1$ to $C_6$ alkoxy, amino and ($C_1$ to $C_6$ alkyl)amino The constituent ring members where at least two of $R^1$, $R^2$ and $R^3$ form a heterocyclic ring of 5 or 6 constituent members may, for example, be a ring selected from the group consisting of pyrrolidine, piperidine, morpholine and piperazine, The preferred amines of formula I are those wherein $R^1$ is $C_1$ to $C_6$ hydroxyalkyl or $C_1$ to $C_{10}$ alkoxy substituted $C_2$ to $C_4$ alkyl and $R^2$ and $R^3$ are independently hydrogen or $C_1$ to $C_4$ alkyl.

The more preferred embodiments comprise the amine of formula I wherein $R^1$ is selected from the group consisting of $C_1$ to $C_6$ hydroxyalkyl and $C_1$ to $C_8$ alkoxy substituted $C_2$ to $C_4$ alkyl, $R^2$ and $R^3$ are selected from hydrogen and $C_1$ to $C_4$ alkyl, preferably hydrogen or methyl.

In one set of embodiments the amine is of formula I wherein $R^1$ is $C_2$ to $C_6$ hydroxylalkyl or $C_1$ to $C_6$ alkoxy-substituted $C_2$ to $C_4$ alkyl and $R^2$ and $R^3$ are hydrogen or $C_1$ to $C_4$ alkyl.

In a further set of embodiments the amine is of formula I wherein $R^1$ is $C_2$ to $C_4$ hydroxyalkyl or $C_1$ to $C_6$ alkoxy substituted $C_2$ to $C_4$ alkyl and $R^2$ and $R^3$ are hydrogen.

The alkyl groups in the alkyl, alkoxy, and substituted alkyl portions may be branched or straight chain and are more preferably straight chain.

Specific examples of amines of formula I include ethanolamine, methoxypropylamine and hexyloxypropylamine. Particularly preferred amines of formula I for use with picloram are methoxypropylamine, monoethanolamine and mixtures thereof. The most preferred amines of formula I for use with aminopyralid and clopyralid are selected from methoxypropylamine and hexyloxypropylamine, particularly hexyloxypropylamine.

The concentrate composition comprises an amide solvent. The amide solvent is, in one set of embodiments, present in an amount of from 25% to 60% by weight of the composition, preferably from 25% to 50% and more preferably from 25% to 45% by weight of the emulsifiable concentrate composition.

Examples of suitable amide solvents include compounds of formula II:

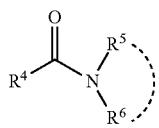

wherein
- R⁴ is selected from the group consisting of hydrogen and $C_1$ to $C_{17}$ hydrocarbyl;
- R⁵ is selected from the group consisting of $C_1$ to $C_{15}$ hydrocarbyl;
- R⁶ is selected from the group consisting of $C_1$ to $C_{15}$ hydrocarbyl; and
- R⁵ and R⁶ may together from a ring incorporating the nitrogen of the amide comprising 4 or 5 methylene groups; preferred examples of R⁵ and R⁶ are independently selected from the group consisting of $C_1$ to $C_6$ hydrocarbyl and the group wherein R⁵ and R⁶ together form a ring incorporating the nitrogen of the amine by a bridging group R⁵ . . . R⁶ of formula —CH₂CH₂CH₂CH₂— or —CH₂CH₂CH₂CH₂CH₂—.

In one embodiment the amide solvent is of formula II wherein
- R⁴ is selected from the group consisting of $C_3$ to $C_{17}$ alkyl, preferably $C_6$ to $C_{17}$ aliphatic; and
- R⁵ and R⁶ are independently selected from the group $C_1$ to $C_6$ alkyl and the group wherein R⁵ and R⁶ together form a bridging group of formula selected from the group consisting of —CH₂CH₂CH₂CH₂— and —CH₂CH₂CH₂CH₂CH₂—, preferably R⁵ and R⁶ are independently selected from $C_1$ to $C_4$ alkyl or the group wherein R⁵ and R⁶ together form a bridging group of formula —CH₂CH₂OCH₂CH₂—, —CH₂CH₂CH₂CH₂— and —CH₂CH₂CH₂CH₂CH₂—.

In a preferred set of embodiments, the amide solvent of formula II wherein
- R⁴ is $C_6$ to $C_{17}$ alkyl; and
- R⁵ and R⁶ are independently selected from $C_1$ to $C_4$ alkyl such as methyl, ethyl, n-propyl, isopropyl.

Examples of the amide solvents include
N,N-dimethyl fatty acid amides such as N,N-dimethyl $C_8$-$C_{16}$ fatty acid amide.

The preferred amide "solvents" are fatty acid amides comprising a $C_5$ to $C_{17}$ aliphatic group.

Specific examples of amide solvents include
N,N-dimethyl-octanamide, N,N-dimethyl-decanamide, N,N-dimethyl-caprylamide, N,N-dimethyl 2-ethylhexanamide, N,N-dimethyl-9-decenamide
N,N-dimethyl-oleamide, N,N-dimethyl-lauricamide (also known as N,N-dimethyl-dodecanamide), N,N-dimethyl-myristicamide (also known as N,N-dimethyl-tetradecanamide) and mixtures of two or more thereof.

The picolinic acid herbicide emulsifiable concentrate may and preferably will, include a hydrocarbon co-solvent. The hydrocarbon co-solvent preferably has a flash point of at least 60.5° C. The hydrocarbon co-solvent preferably comprises at least one hydrocarbon selected from alkyl substituted aromatics such as mono-, di- and trialkyl benzenes and alkyl naphthalenes. For example, $C_9$ alkyl benzene is reported to have a flash point of 42° C. whereas $C_{10}$ alkylbenzene is reported to have a flash point of 66° C. A preferred co-solvent is a mixture of $C_8$ to $C_{12}$ di- and tri-alkyl benzenes, commercially available from Exxon Mobil as Solvesso 150™ and Solvesso 200™ and their low naphthalene variants.

The hydrocarbon co-solvent is preferably in the range of from 2% to 25% w/w of the picloram acid herbicide emulsifiable concentrate. Preferably the hydrocarbon co-solvent is present in an amount of from 5% to 20% w/w and more preferably from 5% to 15% w/w of the picloram acid emulsifiable concentrate.

The picolinic acid herbicide emulsifiable concentrate will typically comprise an emulsifier component. The emulsifier component may, for example, comprise from 2% w/w to 25% w/w of the picolinic acid emulsifiable concentrate. The emulsifier component preferably comprises from 5% w/w to 20% w/w and more preferably from 5% w/w to 15% w/w of the concentrate composition.

The emulsifier component may include anionic, non-ionic, cationic or mixed types of emulsifiers. In one embodiment the concentrate comprises an anionic emulsifier in an amount in the range of from 1% w/w to 10% w/w of the concentrate.

In one set of embodiments, the composition comprises an alkylarylsulfonate emulsifier. Alkylarylsulfonates are anionic surfactants and are available in compositions containing suitable counterions which may be optionally substituted ammonium and metal counterions. Examples of alkylarylsulfonates include butylnaphthalenesulfonic acid, the di- and tri-isopropylnaphthalenesulfonic acids, the salts of the condensation products of sulfonated naphthalene and naphthalene derivatives with formaldehyde, the salts of the condensation products of sulfonated naphthalene and naphthalene derivatives with phenol and formaldehyde, and the salts of alkylarylbenzenesulfonic acids such as dodecylbenzenesulfonic acid. Benzenesulfonates, such as alkyl- or arylbenzenesulfonates, e.g. (poly)alkyl- and (poly)arylbenzenesulfonates which are acidic and neutralized with suitable bases, for example having 1 to 12 carbon atoms per alkyl radical or having up to 3 styrene units in the polyaryl radical, preferably (linear) dodecylbenzenesulfonic acid and oil-soluble salts thereof, such as, for example, the calcium salt or the isopropylammonium salt of dodecylbenzenesulfonic acid.

It is particularly preferred that the composition of the invention contain a salt of dodeclybenzenesulfonic acid. Preferred salts include calcium dodecylbenzenesulfonate and monoalkanolamine salts of dodecylbenzenesulfonate such as the monoethanolamine salt of dodecylbenzenesulfonate.

The composition preferably comprises a nonionic surfactant component. Preferred non-ionic surfactants include the condensation products of alkylene oxide with components forming nonpolar groups such as the condensation products of ethylene oxide with fatty alcohols such as oleyl alcohol and cetyl alcohol; the condensation products of ethylene oxide with phenols and alkylphenols such as isooctylphenol, octylphenol and nonylphenol; the condensation products of ethylene oxide with castor oil; the partial esters derived from long chain fatty acids and hexitol anhydrides, for example sorbitan monolaurate, and their condensation products with ethylene oxide; ethylene oxide/propylene oxide block copolymers; lauryl alcohol polyglycol ether acetal.

Examples of nonionic surfactants which may be used alone or in combination in the emulsifier component are listed below, in which EO=ethylene oxide units, such as PO=propylene oxide units and BO=butylene oxide units:

$C_{10}$-$C_{24}$-alcohols which may be alkoxylated, e.g. with 1-60 alkylene oxide units, preferably 1-60 EO and/or 1-30

PO and/or 1-15 BO in any order. The terminal hydroxyl groups of these compounds can be terminally capped by an alkyl, cycloalkyl or acyl radical having 1-24 carbon atoms. Examples of such compounds are:

Genapol® C, L, O, T, UD, UDD, X products from Clariant, Plurafac® and Lutensol® A, AT, ON, TO products from BASF, Marlipal® 24 and O13 products from Condea, Dehypon® products from Henkel, Ethylan® products from Akzo Nobel, such as Ethylan CD 120.

Copolymers consisting of EO, PO and/or BO units, such as, for example, block copolymers, such as the Pluronic® products from BASF and the Synperonic® products from Uniquema with a molecular weight of from 400 to $10^8$.

Alkyleneoxy adducts of $C_1$-$C_9$ alcohols, such as the Atlas® 5000 series, or in particular Atlas G-5002L from Croda Crop Care or Hoe®-S3510 from Clariant.

Fatty acid and triglyceride alkoxylates, such as the Serdox® NOG products from Condea or alkoxylated plant oils, such as soybean oil, rapeseed oil, corn oil, sunflower oil, cottonseed oil, linseed oil, coconut oil, palm oil, thistle oil, walnut oil, peanut oil, olive oil or rhicinus oil (i.e. castor oil), in particular rapeseed oil and castor oil, plant oils also being understood as meaning their transesterification products, e.g. alkyl esters, such as rapeseed oil methyl ester or rapeseed oil ethyl ester, for example the Emulsogen® products from Clariant, salts of aliphatic, cycloaliphatic and olefinic carboxylic acids and polycarboxylic acids, and alpha-sulfo fatty acid esters as available from Henkel. Particularly preferred in this group are castor oil ethoxylates such as TERMUL®®1284 and TERMUL®®1285 from Huntsman.

Fatty acid amide alkoxylates, such as the Comperlan® products from Henkel or the Amam® products from Rhodia.

Alkyleneoxy adducts of alkynediols, such as the Surfynol® products from Air Products. Sugar derivatives, such as amino and amido sugars from Clariant, glucitols from Clariant, alkyl polyglycosides in the form of the APG® products from Henkel or sorbitan esters in the form of the Span® or Tween® products from Uniquema or cyclodextrine esters or ethers from Wacker.

Alkyleneoxy adducts based on polyol, such as Polyglycol® products from Clariant. Interface-active polyglycerides and derivatives thereof from Clariant. Surface-active compounds based on silicone and/or silane, such as the Tegopren® products from Goldschmidt and the SE® products from Wacker, and the Bevaloid®, Rhodorsil® and Silcolapse® products from Rhodia (Dow Corning, Reliance, GE, Bayer).

Per- or polyfluorinated surface-active compounds, such as Fluowet® products from Clariant, the Bayowet® products from Bayer, the Zonyl® products from Du Pont and products of this type from Daikin and Asahi Glass.

Interface-active sulfonamides, e.g. from Bayer.

Surface-active polyvinyl compounds, such as modified polyvinylpyrolidone, such as the Luviskol® products from BASF and the Agrimer® products from ISP or the derivatized polyvinylacetates, such as the Mowilith® products from Clariant or the butyrates, such as the Lutonal® products from BASF, the Vinnapas® and the Pioloform® products from Wacker or modified polyvinyl alcohols, such as the Mowiol® products from Clariant.

Surface-active polymers based on maleic anhydride and/or reaction products of maleic anhydride, and maleic anhydride and/or reaction products of copolymers which include maleic anhydride, such as the Agrimer®-VEM A products from ISP.

Surface-active derivatives of montane, polyethylene and polypropylene waxes, such as the Hoechst® waxes or the Licowet® products from Clariant.

Poly- or perhalogenated surfactants, such as, for example Emulsogen®-1557 from Clariant.

Phenols which may be alkoxylated, for example phenyl ($C_1$-$C_4$)alkyl ethers or (poly)alkoxylated phenols [=phenol (poly)alkylene glycol ethers], for example having 1 to 50 alkyleneoxy units in the (poly)alkyleneoxy moiety, where the alkylene moiety preferably in each case has 1 to 4 carbon atoms, preferably phenol reacted with 3 to 10 mol of alkylene oxide.

(Poly)alkylphenols or (poly)alkylphenol alkoxylates [=polyalkylphenol (poly)alkylene glycol ethers], for example with 1 to 12 carbon atoms per alkyl radical and 1 to 150 alkyleneoxy units in the polyalkyleneoxy moiety, preferably tri-n-butylphenol or triisobutylphenol reacted with 1 to 50 mol of ethylene oxide, Polyarylphenols or polyarylphenol alkoxylates [=polyarylphenol (poly)alkylene glycol ethers], for example tristyrylphenol polyalkylene glycol ethers with 1 to 150 alkyleneoxy units in the polyalkyleneoxy moiety, preferably tristyrylphenol reacted with 1 to 50 mol of ethylene oxide.

Examples of surfactants from the group of aromatic-based surfactants are the surfactants of the above mentioned groups, preferably phenol reacted with 4 to 10 mol of ethylene oxide, available commercially, for example, in the form of the Agrisol® products (Akcros), triisobutylphenol reacted with 4 to 50 mol of ethylene oxide, commercially available, for example, in the form of the Sapogenat® T products (Clariant), nonylphenol reacted with 4 to 50 mol of ethylene oxide, commercially available, for example, in the form of the Arkopal® products (Clariant), tristyrylphenol reacted with 4 to 150 mol of ethylene oxide, for example from the Soprophor® series, such as Soprophor® FL, Soprophor® 3D33, Soprophor® BSU, Soprophor® 4D-384, Soprophor® CY/8 (Rhodia).

The non-ionic emulsifier present in the compositions of the invention may comprise one such surfactant or a blend of two or more non-ionic surfactants.

The emulsifier is more preferably selected from alcohol ethoxylates, fatty acid ethoxylates, fatty amide ethoxylates and EO/PO block copolymers including butyl based block copolymers. The non-ionic emulsifier preferably comprises in the range of from 2% w/w to 25% w/w of the composition. More preferably the non-ionic emulsifier comprises in the range of from 2% w/w to 20% w/w and more preferably from 2% w/w to 15% w/w of the concentrate.

In one embodiment, the anionic emulsifier comprises from 1% to 10% w/w of the composition and the non-ionic emulsifier comprises from 2% to 15% w/w of the composition.

The picolinic acid emulsifiable concentrate may further comprise N-methyl pyrrolidone (NMP). The amount of NMP, where present, is preferably in the range of from 0.5% by weight to 15% by weight based on the total weight of the concentrate.

NMP is useful to enhance solubility, particularly in concentrates containing further actives of limited solubility such as fluroxypyr. NMP is generally not required in compositions where picolinic acid herbicides are the only active or further actives have the required solubility at the concentrations required. NMP may however also be useful to obtain a higher loading of picolinic acid and/or other actives than would otherwise be possible.

In one set of embodiments the concentrate composition comprises:

picolinic acid in acid form in an amount of at least 20 g/L, more preferably at least 50 g/L and still more preferably at least 100 g/L and most preferably at least 150 g/L;

amide solvent, preferably fatty acid amide in an amount of from 25% to 60% w/w of the composition, more preferably 25% to 50% w/w and most preferably 25% to 45% w/w of the concentrate;

hydrocarbon co-solvent preferably selected from the group of $C_8$-$C_{12}$ di- and tri-alkylbenzenes in an amount of from 2% to 25% w/w, more preferably 5% to 20% w/w and most preferably 5% to 15% w/w of the concentrate;

anionic emulsifier in an amount of from 1% to 10% w/w of the composition;

non-ionic emulsifier in an amount of from 2% to 25% w/w, more preferably 2% to 20% w/w and still more preferably 2% to 15% w/w of the concentrate composition; and monoethanolamine, methoxypropylamine, hexyloxypropylamine or mixture of two or more thereof in an amount of from 0.5% to 5% by weight based on the weight of emulsifiable concentrate, more preferably from 2% to 5% by weight based on the weight of emulsion concentrate and still more preferably from 3% to 5% by weight based on the weight of the emulsifiable concentrate.

The concentrate composition preferably contains little or no water. Preferably the amount of water is less than 5% by volume, more preferably no more than 2% v/v and more preferably no more than 1% v/v of the concentrate.

The composition of the invention has been found to provide good storage stability and also forms an emulsion on dilution with water which has good stability to allow effective application to plants.

There is further provided a method for the preparation of an emulsifiable concentrate of comprising combining picolinic acid herbicide with an amide solvent and amine and heating the compositions, preferably to a temperature of at least 40° C., more preferably 50° C., still more preferably at least 60° C. and most preferably at least 75° C., to provide a solution of the picolinic acid herbicide.

In a further aspect, the invention provides a method of controlling weeds comprising providing an emulsifiable concentrate as hereinbefore described; diluting the concentrate with water to form an emulsion and applying the diluted composition to the weeds.

In a further embodiment the invention provides a method of applying a picolinic acid emulsifiable concentrate composition comprising:

providing an emulsifiable concentrate of picolinic acid herbicide as herein disclosed;

combining the emulsifiable concentrate with a water and optionally a liquid nitrogenous fertilizer to form an oil-in-water emulsion having a discontinuous oil phase comprising the water immiscible solvent;

applying the oil in water emulsion to weeds to be controlled preferably by spray application.

The emulsifiable concentrate may be combined with the liquid fertilizer with additional water being combined with the concentrate and/or the fertilizer or alternatively in some cases an emulsion may be formed with the neat concentrate using liquid nitrogenous fertilizer in the form supplied by the manufacturer.

The composition may comprise one or more further actives selected from the group consisting of herbicides, fungicides, insecticides, plant growth regulators and biologicals.

Examples of additional herbicides may be selected from the following classes:

amide herbicides such as allidochlor, beflubutamid, benzadox, benzipram, bromobutide, cafenstrole, CDEA, cyprazole, dimethenamid, dimethenamid-P, diphenamid, epronaz, etnipromid, fentrazamide, flupoxam, fomesafen, halosafen, isocarbamid, isoxaben, napropamide, naptalam, pethoxamid, propyzamide, quinonamid and tebutam;

anilide herbicides such as chloranocryl, cisanilide, clomeprop, cypromid, diflufenican, etobenzanid, fenasulam, flufenacet, flufenican, mefenacet, mefluidide, metamifop, monalide, naproanilide, pentanochlor, picolinafen and propanil;

arylalanine herbicides such as benzoylprop, flamprop and flamprop-M;

chloroacetanilide herbicides such as acetochlor, alachlor, butachlor, butenachlor, delachlor, diethatyl, dimethachlor, metazachlor, metolachlor, S-metolachlor, pretilachlor, propachlor, propisochlor, prynachlor, terbuchlor, thenylchlor and xylachlor;

sulfonanilide herbicides such as benzofluor, cloransulam, diclosulam, florasulam, flumetsulam, metosulam, perfluidone, pyrimisulfan and profluazol;

sulfonamide herbicides such as asulam, carbasulam, fenasulam, oryzalin, penoxsulam and pyroxsulam, see also sulfonylurea herbicides;

thioamide herbicides such as bencarbazone and chlorthiamid;

antibiotic herbicides such as bilanafos;

aromatic acid herbicides benzoic acid herbicides such as chloramben, 2,3,6-TBA and tricamba;

pyrimidinyloxybenzoic acid herbicides such as bispyribac and pyriminobac;

pyrimidinylthiobenzoic acid herbicides such as pyrithiobac;

phthalic acid herbicides such as chlorthal;

picolinic acid herbicides such as aminopyralid and clopyralid;

quinolinecarboxylic acid herbicides such as quinclorac and quinmerac;

arsenical herbicides such as cacodylic acid, CMA, DSMA, hexaflurate, MAA, MAMA, MSMA, potassium arsenite and sodium arsenite;

benzoylcyclohexanedione herbicides such as mesotrione, sulcotrione, tefuryltrione and tembotrione;

benzofuranyl alkylsulfonate herbicides such as benfuresate and ethofumesate;

carbamate herbicides such as asulam, carboxazole, chloprocarb, dichlormate, fenasulam, karbutilate and terbucarb;

carbanilate herbicides such as barban, BCPC, carbasulam, carbetamide, CEPC, chlorbufam, chlorpropham, CPPC, desmedipham, phenisopham, phenmedipham, phenmedipham-ethyl, propham and swep;

cyclohexene oxime herbicides such as alloxydim, butroxydim, clethodim, cloproxydim, cycloxydim, profoxydim, sethoxydim, tepraloxydim and tralkoxydim;

cyclopropylisoxazole herbicides such as isoxachlortole and isoxaflutole;

dicarboximide herbicides such as benzfendizone, cinidonethyl, flumezin, flumiclorac, flumioxazin, and flumipropyn;

dinitrophenol herbicides such as dinofenate, dinoprop, dinosam, dinoseb, dinoterb, DNOC, etinofen and medinoterb;

diphenyl ether herbicides such as ethoxyfen;

nitrophenyl ether herbicides such as acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen and oxyfluorfen;

dithiocarbamate herbicides such as dazomet and metam;

halogenated aliphatic herbicides such as alorac, chloropon, dalapon, flupropanate, hexachloroacetone, iodomethane, methyl bromide, monochloroacetic acid, SMA and TCA;

imidazolinone herbicides such as imazamethabenz, imazamox, imazapic, imazapyr, imazaquin and imazethapyr;

inorganic herbicides such as ammonium sulfamate, borax, calcium, chlorate, copper sulfate, ferrous sulfate, potassium azide, potassium, yanate, sodium azide, sodium chlorate and sulfuric acid;

nitrile herbicides such as bromobonil, bromoxynil, chloroxynilm, iodobonil, ioxynil and pyraclonil;

organophosphorus herbicides such as amiprofos-methyl, anilofos, bensulide, bilanafos, butamifos, 2,4-DEP, DMPA, EBEP, fosamine, glufosinate, glyphosate, and piperophos;

oxadiazolone herbicides such as dimefuron, methazole, oxadiargyl and oxadiazon;

phenoxy herbicides such as bromofenoxim, clomeprop, 2,4-DEB, 2,4-DEP, difenopenten, disul, erbon, etnipromid, fenteracol and trifopsime;

phenoxyacetic herbicides such as 4-CPA, 2,4-D, 3,4-DA, MCPA, MCPA-thioethyl and 2,4,5-T;

phenoxybutyric herbicides such as 4-CPB, 2,4-DB, 3,4-DB, MCPB and 2,4,5-TB;

phenoxypropionic herbicides such as cloprop, 4-CPP, dichlorprop, dichlorprop-P, 3,4-DP, fenoprop, mecoprop and mecoprop-P;

aryloxyphenoxypropionic herbicides such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop;

phenylenediamine herbicides such as dinitramine, and prodiamine;

phenyl pyrazolyl ketone herbicides such as benzofenap, pyrasulfotole, pyrazolynate, pyrazoxyfen and topramezone;

pyrazolylphenyl herbicides such as fluazolate, nipyraclofen and pyraflufen;

pyridazine herbicides such as credazine, pyridafol and pyridate;

pyridazinone herbicides such as brompyrazon, chloridazon, dimidazon, flufenpyr, metflurazon, norflurazon, oxapyrazon and pydanon;

pyridine herbicides such as aminopyralid, cliodinate, clopyralid, dithiopyr, fluroxypyr, haloxydine, picloram, picolinafen, pyriclor, thiazopyr and triclopyr;

pyrimidinediamine herbicides such as iprymidam and tioclorim;

quaternary ammonium herbicides such as cyperquat, diethamquat, difenzoquat, diquat, morfamquat and paraquat;

thiocarbamate herbicides such as butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate and vernolate;

thiocarbonate herbicides such as dimexano, EXD, proxan and eptam (EPTC);

thiourea herbicides such as methiuron;

triazine herbicides such as dipropetryn; triaziflam and trihydroxytriazine;

chlorotriazine herbicides such as atrazine; chlorazine, cyanazine, cyprazine, eglinazine, ipazine, mesoprazine, procyazine, proglinazine, propazine, sebuthylazine, simazine, terbuthylazine and trietazine;

methoxytriazine herbicides such as atraton, methometon, prometon, secbumeton, simeton and terbumeton;

methylthiotriazine herbicides such as ametryn, aziprotryne, cyanatryn, desmetryn, dimethametryn, methoprotryne, prometryn, simetryn and terbutryn;

triazinone herbicides such as ametridione, amibuzin, hexazinone, isomethiozin, metamitron and metribuzin;

triazole herbicides such as amitrole, cafenstrole, epronaz and flupoxam;

triazolone herbicides such as amicarbazone, bencarbazone, carfentrazone, flucarbazone, propoxycarbazone and sulfentrazone;

triazolopyrimidine herbicides such as cloransulam, diclosulam, florasulam, flumetsulam, metosulam and penoxsulam;

uracil herbicides such as butafenacil, bromacil, flupropacil, isocil, lenacil and terbacil;

urea herbicides such as benzthiazuron, cumyluron, cycluron, dichloralurea, diflufenzopyr, isonoruron, isouron, methabenzthiazuron, monisouron and noruron;

phenylurea herbicides such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluron, phenobenzuron, siduron, tetrafluron and thidiazuron;

sulfonylurea herbicides including: pyrimidinylsulfonylurea herbicides such as amidosulfuron; azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, orthosulfamuron, oxasulfuron, primisulfuron, pyrazosulfuron, rimsulfuron, sulfometuron, sulfosulfuron and trifloxysulfuron;

triazinylsulfonylurea herbicides such as chlorsulfuron, cinosulfuron, ethametsulfuron, iodosulfuron, metsulfuron, prosulfuron, thifensulfuron, triasulfuron, tribenuron, triflusulfuron and tritosulfuron; and thiadiazolylurea herbicides such as buthiuron, ethidimuron, tebuthiuron, thiazafluron and thidiazuron; and unclassified herbicides such as KIH-485, acrolein, allyl alcohol, azafenidin, benazolin, bentazone, benzobicyclon, buthidazole, calcium cyanamide, cambendichlor, chlorfenac, chlorfenprop, chlorflurazole, chlorflurenol, cinmethylin, clomazone, CPMF, cresol, ortho-dichlorobenzene, dimepiperate endothal, fluoromidine, fluridone, flurochloridone, flurtamone, fluthiacet, indanofan, methyl isothiocyanate, OCH, oxaziclomefone, pentachlorophenol, pentoxazone, phenylmercury acetate, pinoxaden, prosulfalin, pyribenzoxim, pyriftalid, quinoclamine, rhodethanil, sulglycapin, thidiazimin, tridiphane, trimeturon, tripropindan and tritac.

The weight ratio of picolinic acid herbicide to other herbicide will depend on the nature of the other herbicide and desired loading of picolinic acid herbicide.

However, typically the weight ratio of picolinic acid herbicide to other herbicide (or herbicides) is in the range of from 30:1 to 1:30 more preferably from 1:1 to 1:20. Preferably the picolinic acid herbicide will constitute more than 15% w/w of the total herbicide content, more preferably at least 70% w/w and most preferably at least 80% w/w.

In one set of embodiments, the other herbicide comprises a benzoic acid herbicide, phenoxy-alkanoic acid herbicide, glyphosate or mixture thereof. Preferred herbicides for use with picolinic acid herbicide are preferably selected from the group consisting of 2,4-D, dicamba, other picolinic acid herbicides, fluoroxypyr, triclopyr, glyphosate and mixtures of two or more thereof.

In a further set of embodiments, the other herbicide comprises a phenoxyalkanoic acid herbicide selected from the group consisting of 2,4-D, 2,4-DB, MCPA, MCPB, dichlorprop, dichlorprop-P, mecoprop and mecoprop-P.

The invention exhibits increased efficacy of the picolinic acid herbicide on an active gram for gram basis when compared to equivalent picolinic acid herbicides presently sold in the marketplace, such as salts, amine salts and esters.

The invention exhibits lower volatility and reduced propensity to drift when compared to other picolinic acid herbicide formulations presently sold in the marketplace.

Advantageously, the invention requires significantly less monoethanolamine to form the salt in aqueous solution.

The invention will now be described with reference to the following Examples. It is to be understood that the Examples are provided by way of illustration of the invention and that they are in no way limiting to the scope of the invention.

EXAMPLES

Examples 1 and 2

Picloram acid EC concentrates were prepared with the components shown in Table 1 using the method shown below the table.

TABLE 1

| Picloram 150 g/L | | |
|---|---|---|
| All g/L NUL | Ex 1 | Ex 2 |
| Picloram as 100% | 150 | 150 |
| Hallcomid M8-10 | 650 | 650 |
| Solvesso 200 | 50 | 50 |
| Termul 1284 | 15 | 15 |
| Toximul 8320 | 50 | 50 |
| Kermat HF60 | 35 | 35 |
| MOPA 100% | 10 | 30 |
| Method of manufacture | A | A |
| Appearance | clear solution | clear solution |
| Low temp stability | pass | pass |
| 1% pH | 2.93 | 4.09 |
| 1% pH 2 wk RT | 2.96 | 4.1 |
| 1% pH 54 C. | 2.96 | 4.1 |
| Density | 1.002 | 1.002 |
| picloram g/L initial | | |
| picloram g/L 2 wk RT | 181.5 | 174.3 |
| picloram g/L 2 wk 54 C. | 182.5 | 174.8 |
| picloram g/L 2 wk 0 C. | 183.2 | 174.7 |
| Emulsion A | pass | pass |
| Emulsion D | pass | pass |
| Foaming ml | 20 | 25 |

Method A—1 L Batches

Weigh out 95% of Hallcomid M-8-10 in a 2 L glass beaker and heat to 75 C whilst stirring with an overhead stirrer.

Maintaining the temperature at 75 C add in Picloram and stir vigorously until fully dissolved.

In a 400 ml glass beaker add in Solvesso followed by Kermat HF60, Termul 1284 and Toximul 8320 and heat to 50° C. and mix until a clear solution results.

While stirring vigorously and maintaining the temperature at 75° C. add in the above based Solvesso 200 mix and stir until homogenous and clear.

Then cool to RT and while stirring slowly add in BASE and stir until homogenous.

Allow to return to RT and make to 1 L with Hallcomid.

Examples 3-10—Mixtures of 2,4-D and Picloram

Emulsifiable concentrate compositions containing both 2,4-D and picloram in acid form were prepared by combining the components in the parts by weight shown in Table 2 and using the manufacturing method described.

TABLE 2

| Picloram/24 D 22.5/360 g/L | | | | | | | | |
|---|---|---|---|---|---|---|---|---|
| All g/L | Ex 3 | Ex 4 | Ex 5 | Ex 6 | Ex 7 | Ex 8 | Ex 9 | Ex 10 |
| Picloram as 100% | 22.5 | 22.5 | 22.5 | 22.5 | 22.5 | 64 | 64 | 64 |
| 2,4D as 100% | 360 | 380 | 360 | 360 | 360 | 240 | 240 | 240 |
| Hallcomid M8-10 | 520 | 520 | 510 | 510 | 510 | 550 | 550 | 550 |
| Solvesso 200 | 50 | 50 | 50 | 50 | 50 | 50 | 50 | 50 |
| Termul 1284 | 60 | 60 | | | | 60 | 60 | 60 |
| Toximul 8320 | 50 | 50 | 110 | 110 | 110 | 50 | 50 | 50 |
| MOPA 100% | 20 | 40 | 10 | 20 | 20 | 10 | 30 | 50 |
| Appearance | clear sol | clear sol | clear sol | clear sol | clear sol | clear sol | clear sol | clear sol |
| Low temp stability | clear sol | clear sol | clear sol | clear sol | clear sol | clear sol | clear sol | clear sol |
| 1% pH | 3.32 | 3.73 | 3.21 | 3.67 | 3.97 | 3.15 | 3.56 | 3.75 |
| Density | 1.073 | 1.073 | 1.074 | 1.074 | 1.074 | 1.049 | 1.049 | 1.049 |
| picloram g/L initial | 23.5 | 22.9 | 25.6 | 25.1 | 24.9 | 64.7 | 63.6 | 62.3 |
| picloram g/L initial HYD | 23.4 | | 25 | 24.6 | 23.8 | 64.1 | 63.3 | 62.8 |
| Emulsion A | pass | pass | pass | pass | pass | pass | pass | pass |
| Emulsion D | pass | pass | pass | pass | pass | pass | pass | pass |
| Foaming ml | 12 | 12 | 8 | 8 | 8 | 20 | | |

Manufacturing Method—1 L Batches

1. Weigh out Hallcomid M-8-10 into a 2 L glass beaker and add in Picloram and heat on a hot plate to 75° C. whilst stirring with an overhead stirrer until a clear solution results.
2. When the above solution is clear add 2,4D and maintain at 75° C. whilst stirring with an overhead stirrer until a clear solution results.
3. To a 400 ml glass beaker with a magnetic stirrer add in Solvesso 200, Toximul 1284, and Toximul 8320 and mix at 50° C. until homogenous and a clear solution results.
4. To the 2 L beaker add in the contents of the 400 ml beaker whilst vigorously stirring and maintain the temperature at 75° C.
5. Mix until homogenous and clear and allow to cool.
6. When at 40° C. check 1% pH.
7. Add in Base and mix for ten minutes.
8. Allow to cool to 20° C. and fill into a 1 L batch and make up to volume with Hallcomid M-8-10.

Examples 11-20—EC Compositions Containing Dicamba and Picloram

Emulsifiable concentrate compositions were prepared by combining the components shown in Table 3 in the parts by weight listed and using the manufacturing method described. Composition properties are also recorded in Table 18.

The formulations all passed 2 weeks stability at 54° C. and RT and one week Low temperature stability at 0° C. Picloram/Dicamba 22.5/260 g/L and 25/300 g/L concentrations being produced.

Example Compositions had good stability, emulsion stability and viscosity.

Method A—1 L Batches

1. Weigh out 95% of Hallcomid M-8-10 in a 2 L glass beaker and heat to 75° C. whilst stirring with an overhead stirrer.
2. Maintaining the temperature at 75° C. add in Picloram and stir vigorously until fully dissolved.
3. Maintaining the temperature at 75° C. add in Dicamba and stir vigorously until fully dissolved and then add in.
4. In a 400 ml glass beaker add in Solvesso followed by Kermat HF60, Termul 1284 and Toximul 8320 and heat to 50° C. and mix until a clear solution results.
5. While stirring vigorously and maintaining the temperature at 75° C. add in the above based Solvesso 200 mix and stir until homogenous and clear.
6. Then cool to RT and while stirring slowly add in BASE and stir until homogenous.
7. Allow to return to RT and make to 1 L with Hallcomid.

Examples 21-26—Mixture of Picloram Acid Fluroxypyr Acid in EC Form

The composition were prepared using the components set out in Table 4 and 5 in accordance with the method of manufacture set out below the tables.

TABLE 4

|  | Ex 21 |
|---|---|
| Fluroxypyr | 111 |
| Picloram | 75 |
| NMP | 50 |
| MOPA 100% | 5 |
| Tomamine 100% |  |
| Hallcomid M8-10 | 300 |
| Solvesso 200 | 25 |
| Termul 1284 | 7.5 |

TABLE 3

| All g/L | Ex 11 | Ex 12 | Ex 13 | Ex 14 | Ex 15 | Ex 16 | Ex 17 | Ex 18 | Ex 19 | Ex 20 |
|---|---|---|---|---|---|---|---|---|---|---|
| Picloram as 100% | 22.5 | 22.5 | 22.5 | 22.5 | 22.5 | 22.5 | 25 | 25 | 25 | 22.5 |
| Dicamba as 100% | 260 | 260 | 260 | 260 | 260 | 260 | 300 | 300 | 300 | 260 |
| Hallcomid M8-10 | 567 | 520 | 520 | 550 | 550 | 550 | 535 | 535 | 535 | 560 |
| Solvesso 200 | 50 | 50 | 50 | 50 | 50 | 50 | 50 | 50 | 50 | 50 |
| Termul 1284 | 15 | 15 | 15 | 15 | 15 | 15 | 15 | 15 | 15 | 15 |
| Toximul 8320 | 50 | 50 | 50 | 50 | 50 | 50 | 50 | 50 | 50 | 50 |
| Kermat HF60 | 35 | 35 | 35 | 35 | 35 | 35 | 35 | 35 | 35 | 35 |
| MEA 100% | 10 |  | 20 |  |  |  |  |  |  | 5 |
| TEA 99% |  |  |  | 10 | 20 | 30 | 10 | 20 | 30 |  |
| MOPA 100% |  |  |  |  |  |  |  |  |  | 5 |
| Appearance | clear solution | clear solution | clear solution | clear solution | clear solution | clear solution | clear solution | clear solution | clear solution | clear solution |
| Low temp stability | clear solution | clear solution | clear solution | clear solution | clear solution | clear solution | clear solution | clear solution | clear solution | clear solution |
| 1% pH | 2.8 | 2.69 | 3.02 | 2.75 | 2.95 | 3.2 | 2.64 | 2.83 | 3.06 | 2.8 |
| Density | 1.036 | 1.025 | 1.025 | 1.033 | 1.033 | 1.033 | 1.052 | 1.052 | 1.052 | 1.034 |
| picloram g/L initial | 24.3 | 23.2 | 23.4 | 23.8 | 23.3 | 22.8 | 25.5 | 25 | 24.5 |  |
| picloram g/L 2 wk RT | 24.6 | 23.6 | 23.2 | 23.6 | 23.1 | 22.7 |  |  |  |  |
| picloram g/L 2 wk 54 C. | 24.4 | 23.4 | 23 | 23.3 | 22.9 | 22.5 |  |  |  |  |
| picloram g/L 2 wk 0 C. | 24.6 | 23.6 | 23.2 | 23.6 | 23.1 | 22.7 |  |  |  |  |
| Dicamba g/L initial | 254 | 238 | 239 | 257 | 252 | 248 | 296 | 290 | 284 |  |
| Dicamba g/L 2 wk RT | 258 | 241 | 237 | 257 | 252 | 247 |  |  |  |  |
| Dicamba g/L 2 wk 54 C. | 257 | 241 | 236 | 257 | 251 | 247 |  |  |  |  |
| Dicamba g/L 2 wk 0 C. | 258 | 241 | 238 | 257 | 253 | 248 |  |  |  |  |
| Emulsion A | pass | pass | pass | pass | pass | pass | pass | pass | pass | pass |
| Emulsion D | pass | pass | pass | pass | pass | pass | pass | pass | pass | pass |
| Foaming ml | 10 | 10 | 10 | 20 | 20 | 20 | 20 | 20 | 20 |  |

TABLE 4-continued

|  | Ex 21 |
|---|---|
| Toximul 8320 | 25 |
| Kermat HF60 | 17.5 |
| Appearance | Clear solution |

TABLE 5

| all g/L | Ex 22 | Ex 24 | Ex 25 | Ex 26 |
|---|---|---|---|---|
| Fluroxypyr | 110 | 110 | 110 | 110 |
| Picloram | 110 | 110 | 110 | 110 |
| NMP | 50 | 50 | 50 | 50 |
| MOPA 100% | 10 | 20 | 30 | 10 |
| MEA 100% |  |  |  |  |
| Tomamine 100% |  |  |  | 20 |
| Hallcomid M8-10 | 480 | 480 | 480 | 480 |
| Solvesso 200 | 50 | 50 | 50 | 50 |
| Termul 1284 | 60 | 60 | 60 | 60 |
| Toximul 8320 | 50 | 50 | 50 | 50 |
| Kermat HF60 |  |  |  |  |
| Appearance | Clear solution | Clear solution | Clear solution | Clear solution |
| Low temp stability | pass | pass | pass | pass |
| 1% pH | 2.94 | 3.28 | 3.57 | 3.2 |
| Density | 1.037 | 1.037 | 1.037 | 1.037 |
| Fluroxypyr g/L | 114.8 | 113.1 | 112.1 | 112.5 |
| Dicamba g/L |  |  |  |  |
| 24D g/L |  |  |  |  |
| Picloram g/L | 121 | 119.4 | 118.4 | 118.9 |
| Emulsion A 30 mins | 0 ml pass | 0 ml pass | 0 ml pass | 0 ml pass |
| Emulsion D 30 mins | 0 ml pass | 0 ml pass | 0 ml pass | 0 ml pass |
| Emulsion A 2 hours | 0 ml pass | 0 ml pass | 0 ml pass | 0 ml pass |
| Emulsion D 2 hours | 0 ml pass | 0 ml pass | 0 ml pass | 0 ml pass |
| Foaming ml | 30 | 25 |  | 30 |

Method—Fluroxypyr and Picloram
1. Weigh out 95% of Hallcomid M-8-10 and NMP in a 2 L glass beaker and heat to 75° C. whilst stirring with an overhead stirrer.
2. Maintaining the temperature at 75° C. add in Picloram and stir vigorously until fully dissolved.
3. Maintaining the temperature at 75° C. add in Fluroxypyr and stir vigorously until fully dissolved and then add in.
4. In a 400 ml glass beaker add in Solvesso followed by Kermat HF60, Termul 1284 and Toximul 8320 and heat to 50° C. and mix until a clear solution results.
5. While stirring vigorously and maintaining the temperature at 75° C. add in the above based Solvesso 200 mix and stir until homogenous and clear.
6. Then cool to RT and while stirring slowly add in BASE and stir until homogenous.
7. Allow to return to RT and make to 1 L with Hallcomid.

Examples 27—Clopyralid 300 g/L

The composition of Example 27 was prepared with the components shown in Table 6 and the process listed below Table 6.

TABLE 6

| Clopyralid batch | | |
|---|---|---|
|  | % purity | actual g |
| Clopyralid | 95.8 | 313.15 |
| NMP |  | 50 |

TABLE 6-continued

| Clopyralid batch | | |
|---|---|---|
|  | % purity | actual g |
| Termul 1284 | 100 | 60 |
| Toximul 8320 | 100 | 50 |
| Solvesso 200 | 100 | 50 |
| HOPA 100% | 100 | 20 |
| Hallcomid M-8-10 | 100 | To 1 L |

Process
1. Weigh out Hallcomid M-8-10 (450 g) and NMP (50 g) into a 2 L glass beaker and heat to 65° C. on a hot plate.
2. Add in Clopyralid (313.15 g) to the above solution with stirring and maintaining heat at 65 C whilst stirring with an overhead stirrer until a clear solution results.
3. To a 400 ml glass beaker with a magnetic stirrer add in Solvesso 200 (50 g), Termul 1284 (60 g) and Toximul 8320 (50 g) and mix at 50 C until homogenous and a clear solution results.
4. To the 2 L beaker add in the contents of the 400 ml beaker whilst vigotously stirring and maintain the temperature at 65° C.
5. Mix until homogenous and clear and allow to cool.
6. When at 40° C. check 1% pH.
7. Add in HOPA (20 g) whilst stirring and mix for 10 minutes
8. Allow to cool to 20 C and fill into a 1 L batch and make up to volume with Hallcomid M-8-10.

The composition of Example 27 was examined and the results shown in Table 7.

TABLE 7

| Assay g/L |  | Emulsion stability St A water | pass |
|---|---|---|---|
| Appearance | Brown clear solution | Emulsion stability ST C water) | pass |
| 1% pH | 2.21 | Low temp stab on |  |
| SG | 1.065 | Viscosity 5 c cp | 106 |
| Foaming ml | 16 | Viscosity 20 C. | 55 |

Examples 28-31—Clopyralid 300 g/L

The procedure of Example 27 was followed with different amounts of HOPA being added in step 7 to provide the compositions of Examples 28-32 shown in Table 8.

TABLE 8

|  | Ex 28 | Ex 29 | Ex 30 | Ex 31 |
|---|---|---|---|---|
| Clopyralid as 100% | 300 | 300 | 300 | 300 |
| NMP | 50 | 50 | 50 | 50 |
| HOPA 100% | 20 | 30 | 40 | 60 |
| Hallcomid M8-10 | 450 | 450 | 450 | 450 |
| Solvesso 200 | 50 | 50 | 50 | 50 |
| Termul 1284 | 15 | 15 | 15 | 15 |
| Toximul 8320 | 50 | 50 | 50 | 50 |
| Method of manufacture | A | A | A | A |
| Appearance | Clear solution | Clear solution | Clear solution | Clear solution |
| Low temp stability | pass | pass | pass | pass |
| 1% pH | 2.21 | 2.24 | 2.28 | 2.32 |
| Density | 1.065 | 1.065 | 1.065 | 1.065 |
| Clopyralid g/L | 316.7 | 311.4 | 309.2 | 304.4 |

TABLE 8-continued

|  | Ex 28 | Ex 29 | Ex 30 | Ex 31 |
|---|---|---|---|---|
| Emulsion A 30 mins | 0 ml pass | 0 ml pass | 0 ml pass | 0 ml pass |
| Emulsion D 30 mins | 0 ml pass | 0 ml pass | 0 ml pass | 0 ml pass |
| Viscosity 5 C. cp | 106 |  |  |  |
| Viscosity 20 C. cp | 55 |  |  |  |
| Foaming ml | 10 |  |  |  |

The presence of HOPA was found to significantly improve the stability of the emulsion.

Comparative Examples CE4 to CE7

The compositions shown in Table 9 were prepared using the general procedure of Example 27 but in the absence of HOPA. The emulsifier (Termul 1284, Teric 12 A7N, Toximul 8320) with solvesso in step 3.

TABLE 9

| All g/L Formulation # | CE4 | CE5 | CE6 | CE7 | CE8 |
|---|---|---|---|---|---|
| Clopyralid Tech | 300 | 300 | 300 | 300 | 300 |
| Kemmat HF6 | 40 | 48 | 50 | 67 | 35 |
| Termul 1284 | 30 | 36 | 37.5 | 50 | 15 |
| Teric 12A7N | 20 | 24 | 25 | 33.4 |  |
| Toximul 8320 |  |  |  |  | 50 |
| NMP | 50 | 50 | 50 | 50 | 50 |
| SOLVESSO 200 | 100 | 100 | 100 | 100 | 50 |
| Hallcomid | to 1 L | to 1 L | to 1 L | to 1 L | to 1 L |
| Appearance | Clear dark brown solution | Clear dark brown solution | Clear dark brown solution | Clear dark brown solution | Clear dark brown solution |
| Emulsion STD WATER A (mL of cream after 30 mins) | FAIL | FAIL | FAIL | FAIL | FAIL |
| Emulsion STD WATER D (mL of cream after 30 mins) | FAIL | FAIL | FAIL | FAIL | FAIL |

Example 32—Aminopyralid 300 g/L

The composition of Example 32 was prepared by combining the components listed in Table 10 in accordance with the process listed below Table 10.

TABLE 10

| AHS 54 | % purity | actual g |
|---|---|---|
| Aminopyralid | 96.5 | 310.88 |
| NMP | 50 | 50 |
| Termul 1284 | 100 | 60 |
| Toximul 8320 | 100 | 50 |
| Solvesso 200 | 100 | 50 |
| HOPA 100% | 100 | 20 |
| Hallcomid M-8-10 | 100 | To 1 L |

Process
1. Weigh out Hallcomid M-8-10 (450 g) and NMP (50 g) into a 2 L glass beaker and heat to 65° C. on a hot plate.
2. Add in Aminopyralid (310.88 g) to the above solution with stirring and maintaining heat at 65° C. whilst stirring with an overhead stirrer until a clear solution results. Needed an extra 250 ml of Hallcomid and 50 g NMP to fully dissolve the Aminopyralid
3. To a 400 ml glass beaker with a magnetic stirrer add in Solvesso 200 (50 g), Termul 1284 (60 g) and Toximul 8320 (50 g) and mix at 50 C until homogenous and a clear solution results.
4. To the 2 L beaker add in the contents of the 400 ml beaker whilst vigotously stirring and maintain the temperature at 65° C.
5. Mix until homogenous and clear and allow to cool.
6. When at 40 C check 1% pH. pH 2.58 Volume 1300 ml after 125 u filtering, negligible residue found.
7. Add in HOPA (20 g) whilst stirring and mix for 10 minutes. Because of the extra volume, 25 g of HOPA added to make it still 20 g/L
8. Allow to cool to 20° C. and fill into a 1 L batch and make up to volume with Hallcomid M-8-10. Non required as already at 1300 ml making approx 231 g/L Aminopyralid.

The composition of Example 32 was examined and the results are shown in Table 11.

TABLE 11

| Appearance | Clear brown solution | Emulsion stability St D water | Nil, Pass |
|---|---|---|---|
|  |  | Emulsion stability ST C water | Nil, Pass |
| 1% pH | 2.58 | Low temp stab on |  |
| SG | 1.028 | Assay g/L |  |
| Foaming ml | 30 |  |  |

Example 33—Aminopyralid 200 g/L

The composition of Example 33 was prepared by combining the components listed in Table 12 in accordance with the process listed below in Table 12.

TABLE 12

| AHS 57 | % purity | actual g |
|---|---|---|
| Aminopyralid | 96.5 | 207.25 |
| NMP | 50 | 50 |
| Termul 1284 | 100 | 60 |
| Toximul 8320 | 100 | 50 |
| Solvesso 200 | 100 | 50 |
| HOPA 100% | 100 | 20 |
| Hallcomid M-8-10 | 100 | To 1 L |

Process
1. Weigh out Hallcomid M-8-10 (450 g) and NMP (50 g) into a 2 L glass beaker and heat to 65° C. on a hot plate. Clear solution
2. Add in Aminopyralid (207.25 g) to the above solution with stirring and maintain heat at 65° C. whilst stirring with an overhead stirrer until a clear solution results.
3. To a 400 ml glass beaker with a magnetic stirrer add in Solvesso 200 (50 g), Termul 1284 (60 g) and Toximul 8320 (50 g) and mix at 50 C until homogenous and a clear solution results. Clear solution
4. To the 2 L beaker add in the contents of the 400 ml beaker whilst vigotously stirring and maintain the temperature at 65° C.
5. Mix until homogenous and clear and allow to cool.

6. When at 40° C. check 1% pH. pH 2.5
7. Add in HOPA (20 g) whilst stirring and mix for 10 minutes
8. Allow to cool to 20° C. and fill into a 1 L batch and make up to volume with Hallcomid M-8-10.

Examples 34 and 35

Examples 34 and 35 were produced by adding the relevant amounts of HOPA to 200 ml aliquots of the compositions of Example 33.

The composition performance is shown in Table 13.

TABLE 13

Aminopyralid 250 with different amounts of HOPA

| Initial % HOPA | Ex | emulsion C 30 mins | emulsion C 2 hrs | emulsion C 4 hrs | emulsion C 72 hrs | pH .1% | density | assay g/L |
|---|---|---|---|---|---|---|---|---|
| 2 | 33 | nil | nil | nil | nil | 2.69 | 1.016 | 189.7 |
| 3 | 34 | nil | nil | nil | nil | 2.78 | 1.016 | 187 |
| 4 | 35 | nil | nil | nil | nil | 2.81 | 1.016 | 186.1 |

| Initial % HOPA | Ex | emulsion D 30 mins | emulsion D 2 hrs | emulsion D 4 hrs | emulsion D 72 hrs | Foam ml | Visc cp 5 C. | Visc cp 20 C. |
|---|---|---|---|---|---|---|---|---|
| 2 | 33 | nil | nil | nil | nil | 30 | 154 | 86 |
| 3 | 34 | nil | nil | nil | nil | 25 | 218 | 67 |
| 4 | 35 | nil | nil | nil | nil | 30 | 234 | 116 |

Example 36—Aminopyralid—200 g/L

The composition of Example 36 was prepared by combining the components shown in Table 14 using the process listed below Table 14.

TABLE 14

| AHS 60 | % purity | actual g |
|---|---|---|
| Aminopyralid | 96.5 | 207.25 |
| NMP | 50 | 75 |
| Termul 1284 | 100 | 60 |
| Toximul 8320 | 100 | 50 |
| Solvesso 200 | 100 | 50 |
| HOPA 100% | 100 | 30 |
| Hallcomid M-8-10 | 100 | To 1 L |

Process
1. Weigh out Hallcomid M-8-10 (450 g) and NMP (75 g) into a 2 L glass beaker and heat to 65° C. on a hot plate. Clear solution
2. Add in Aminopyralid (207.25 g) to the above solution with stirring and maintaining heat at 65° C. whilst stirring with an overhead stirrer until a clear solution results. Clear solution
3. To a 400 ml glass beaker with a magnetic stirrer add in Solvesso 200 (50 g), Termul 1284 (60 g) and Toximul 8320 (50 g) and mix at 50° C. until homogenous and a clear solution results. Clear solution
4. To the 2 L beaker add in the contents of the 400 ml beaker whilst vigotously stirring and maintain the temperature at 65° C. Clear solution
5. Mix until homogenous and clear and allow to cool.
6. When at 40° C. check 1% pH. pH 2.51
7. Add in HOPA (30 g) whilst stirring and mix for 10 minutes Clear solution
8. Allow to cool to 20° C. and fill into a 1 L batch and make up to volume with Hallcomid M-8-10. Needed 70 g The composition of Example 36 was examined and the results are shown in Table 15.

TABLE 15

| Viscosity 5 C. | 226 cp | Viscosity 20 C. | 61 cp |
|---|---|---|---|
| Appearance | Clear brown solution | Emulsion stability ST D/A water) | Pass/pass |
| 1% pH | 2.69 | Low temp stab on 23.06.15 | |
| Density | 1.021 | Assay g/L | 202.8 |
| Foaming ml | 5 | | |

Example 37

The composition of Example 37 was prepared by combining the composition of Example 36 (200 ml) with Hallcomid (50 g) and mixing for 20 mins. approx. 160 g/L.

The composition of Example 37 was examined and the results are shown in Table 16.

TABLE 16

| Appearance | Clear brown solution | Emulsion stability ST D/A water) | Pass/pass |
|---|---|---|---|
| 1% pH | 2.77 | Low temp stab | |
| Density | 0.989 | Assay g/L | 156.5 |

In the Examples, the products identified are as follows:
Atlas™ G-5002L—butyl block copolymer polymeric non-ionic oil-in-water emulsifier.
Synperonic™ A11—polyoxyethylene (11) $C_{12}$-$C_{15}$ alcohol non-ionic emulsifier.
Calsogen™ ARL 100ND—alkyl benzene sulfonate anionic emulsifier.
Solvesso 200—alkylbenzene IBP 220° C.
Solvesso™ 200 ULN—alkylbenzene IBP 220° C. (low naphthalene content)
Tomamine™—PA—10 L is a commercial brand of hexyloxypropylamine available from Air Products and Chemicals, Inc.
KEMMAT™ HF60—calcium dodecyl benzene sulfonate.
TERMUL™ 1284—ethoxylated castor oil emulsifier.
TOXIMUL™8320—butyl block copolymer, polymeric emulsifier.
HALLCOMID™ M 8-10 N,N-dimethyl decanamide
MEA—monoethanolamine
TIPA—triisopropanolamine
MIPA—monoisopropylamine
DEA—diethanolamine
TEA—triethanolamine
EDA—ethylenediamine DETA—diethylenetriamine
MOPA—methoxypropylamine
HOPA—hexyloxypropylamine
Rhodiasolv™ Match 111—non-ionic solvent blend
BEROL™ 106—ethoxylated castor oil

The invention claimed is:

1. An emulsifiable concentrate of a picolinic acid herbicide comprising the picolinic acid herbicide dissolved in an amide solvent and at least one amine solvent, wherein the concentrate comprises the picolinic acid herbicide in acid form;
the amine comprises at least one of formula (I)

wherein $R^1$ is $C_1$ to $C_6$ hydroxyalkyl and $R^2$ and $R^3$ are hydrogen, or $R^1$ is $C_1$ to $C_{10}$ alkoxy substituted $C_2$ to $C_4$ alkyl and $R^2$ and $R^3$ are hydrogen; and
the amide solvent comprises at least one compound of formula (II):

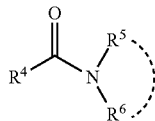

wherein
$R^4$ is selected from the group consisting of hydrogen and $C_1$ to $C_{17}$ hydrocarbyl;
$R^5$ is selected from the group consisting of $C_1$ to $C_{15}$ hydrocarbyl;
$R^6$ is selected from the group consisting of $C_1$ to $C_{15}$ hydrocarbyl; and
$R^5$ and $R^6$ may together form a ring incorporating the nitrogen of the amide comprising 4 or 5 methylene groups.

2. An emulsifiable concentrate according to claim 1, wherein in the amine of formula (I), $R^1$ is $C_1$ to $C_6$ hydroxyalkyl and $R^2$ and $R^3$ are hydrogen.

3. An emulsifiable concentrate according to claim 1, wherein in the amine of formula (I), $R_1$ is $C_1$ to $C_6$ alkoxy-substituted $C_2$ to $C_4$ alkyl and $R_2$ and $R_3$ are hydrogen.

4. An emulsifiable concentrate according to claim 1, wherein the amine comprises at least one selected from the group consisting of ethanolamine, methoxypropylamine and hexyloxypropylamine.

5. An emulsifiable concentrate according to claim 1, wherein the amine is present in an amount of from 0.5% to 5% by weight based on the weight of emulsifiable concentrate.

6. An emulsifiable concentrate according to claim 1, wherein in the amide solvent of formula (II):
$R^5$ and $R^6$ are independently selected from the group consisting of $C_1$ to $C_6$ hydrocarbyl and the group wherein $R^5$ and $R^6$ together form a ring incorporating the nitrogen of the amine and —$CH_2 CH_2 CH_2 CH_2$— or —$CH_2 CH_2 CH_2 CH_2 CH_2$—.

7. An emulsifiable concentrate according to claim 6, wherein the amide solvent is of formula II wherein
$R^4$ is $C_6$ to $C_{17}$ alkyl; and
$R^5$ and $R^6$ are independently selected from $C_1$ to $C_4$ alkyl.

8. An emulsifiable concentrate according to claim 1, wherein amide solvent is selected from the group consisting of N,N-dimethyl octanamide, N,N-dimethyl-decanamide, N,N-dimethyl-caprylamide, N,N-dimethyl-2-ethylhexanamide, N,N-dimethyl-oleamide, N,N-dimethyllauricamide, N,N-dimethylmyristicamide, N,N-dimethyl-9-decenamide, and mixtures of two or more thereof.

9. An emulsifiable concentrate according to claim 1, wherein the amide solvent is present in an amount of from 25% to 60% by weight of the emulsifiable concentrate composition.

10. An emulsifiable concentrate according to claim 1, further comprising a hydrocarbon co-solvent which has a flash point of at least 60.5° C. and comprises at least one hydrocarbon selected from alkyl substituted aromatics.

11. An emulsifiable concentrate according to claim 10, wherein the hydrocarbon co-solvent is present in an amount in the range of from 2% to 25% w/w of the emulsifiable concentrate.

12. An emulsifiable concentrate according to claim 1, comprising emulsifier in an amount in the range of from 5% w/w to 25% w/w of the emulsifiable concentrate composition.

13. An emulsifiable concentrate according to claim 12, wherein the emulsifier comprises a non-ionic emulsifier selected from the group consisting of alcohol ethoxylates, fatty acid ethoxylates, fatty amide ethoxylates and EO/PO block copolymers in an amount in the range of from 2% w/w to 20% w/w of the emulsifiable concentrate composition.

14. An emulsifiable concentrate according to claim 12 comprising anionic emulsifier in an amount of from 1% to 10% w/w of the composition and a non-ionic emulsifier in an amount of from 2% to 15% w/w of the composition.

15. An emulsifiable concentrate according to claim 1, wherein picolinic acid herbicide is present in the emulsifiable concentrate in an amount of at least 20 g/L.

16. An emulsifiable concentrate according to claim 1 comprising at least one other herbicide wherein the weight ratio of picolinic acid herbicide to other herbicide is in the range of from 30:1 to 1:30.

17. An emulsifiable concentrate according to claim 16, wherein the other herbicide comprises at least one selected from the group consisting of 2,4-D, MCPA, dichlorprop, dichlorprop-P, mecoprop, mecoprop-P, 2,4-DB and MCPB wherein at least one further herbicide is in acid form.

18. An emulsifiable concentrate according to claim 1, wherein the picolinic acid herbicide is selected from the group consisting of picloram, clopyralid and aminopyralid.

19. An emulsifiable concentrate comprising:
picolinic acid herbicide in acid form in an amount of at least 50 g/L;
amide solvent selected from the group consisting of N,N-dimethyl octanamide, N,N-dimethyl-decanamide, N,N-dimethyl-caprylamide, N,N-dimethyl-2-ethylhexanamide, N,N-dimethyl-oleamide, N,N-dimethyllauricamide, N,N-dimethylmyristicamide, N,N-dimethyl-9-decenamide, and mixtures of two or more thereof in an amount of from 25% to 60% w/w of the concentrate composition;
hydrocarbon co-solvent in an amount of from 2% to 25% w/w of the concentrate composition;
emulsifier in an amount in the range of from 5% w/w to 25% w/w of the concentrate composition; and monoethanolamine, methoxypropylamine, hexyloxypropylamine or mixture of two or more thereof in an amount of from 0.5% to 5% by weight based on the weight of the concentrate composition.

* * * * *